United States Patent
Bazin et al.

(10) Patent No.: US 11,823,339 B2
(45) Date of Patent: Nov. 21, 2023

(54) LOCALIZATION ACCURACY RESPONSE

(71) Applicant: Apple Inc., Cupertino, CA (US)

(72) Inventors: Jean-Charles Bernard Marcel Bazin, Sunnyvale, CA (US); Anselm Grundhoefer, Campbell, CA (US); Bart Trzynadlowski, Santa Clara, CA (US); Thomas J. Moore, Northglenn, CO (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 17/711,119

(22) Filed: Apr. 1, 2022

(65) Prior Publication Data

US 2022/0319128 A1    Oct. 6, 2022

Related U.S. Application Data

(60) Provisional application No. 63/171,182, filed on Apr. 6, 2021.

(51) Int. Cl.
*G06T 19/00*     (2011.01)
*G06T 7/70*      (2017.01)
*G06T 15/00*     (2011.01)

(52) U.S. Cl.
CPC .............. *G06T 19/006* (2013.01); *G06T 7/70* (2017.01); *G06T 15/00* (2013.01); *G06T 2207/20081* (2013.01); *G06T 2207/30244* (2013.01)

(58) Field of Classification Search
None
See application file for complete search history.

(56) References Cited

U.S. PATENT DOCUMENTS

2019/0287311 A1* 9/2019 Bhatnagar ............... G06T 15/08
2021/0264674 A1* 8/2021 Shahrokni ............... G06F 3/013

* cited by examiner

*Primary Examiner* — Robert J Craddock
(74) *Attorney, Agent, or Firm* — Thompson Hine LLP

(57) ABSTRACT

Various implementations disclosed herein include devices, systems, and methods that provide XR in which virtual objects are positioned based on the accuracy of localizing an electronic device in a physical environment. In some implementations, the technique assesses the accuracy of localization (e.g., centimeter-level accuracy, room-level accuracy, and building-level accuracy) and dynamically adjusts a display strategy. In some implementations, the technique determines a condition causing inaccuracy (e.g., a semantic condition such as "too fast", "too far", "too dark"), and provides a notification (e.g., "too fast-slow down", "too far-move closer", "too dark-turn on a light") at the electronic device based on the condition causing the inaccuracy in the localization.

20 Claims, 17 Drawing Sheets

LOCALIZATION ACCURACY RESPONSE

CROSS-REFERENCE TO RELATED APPLICATIONS

This application claims the benefit of U.S. Provisional Application Ser. No. 63/171,182 filed Apr. 6, 2021, which is incorporated herein in its entirety.

TECHNICAL FIELD

The present disclosure generally relates to electronic devices that render extended reality (XR) content and, in particular, to systems, methods, and devices in which virtual content is positioned based on the location of an electronic device within a physical environment.

BACKGROUND

The location of a device within a physical environment may be determined and used to display virtual content within an XR environment. The accuracy of a determined location may vary in different circumstances. For example, computer-vision localization techniques provide differing levels of location accuracy depending upon the images of a physical environment that are used. In circumstances in which virtual objects are positioned relative to objects of a physical environment, inaccurate localization of the electronic device may result in inaccurate positioning of the virtual objects, e.g., a virtual object that is intended to be positioned on a table may appear to be floating in mid-air.

SUMMARY

Various implementations disclosed herein include devices, systems, and methods that select a display strategy for virtual content based on the accuracy of localizing an electronic device within a physical environment. Virtual objects are positioned based on the accuracy of localizing the electronic device's pose (e.g., position and orientation) within the physical environment. In some implementations, the accuracy of localization is assessed to determine an accuracy level, such as centimeter-level accuracy, room-level accuracy, building-level accuracy, etc. A display strategy may be selected based on a determined accuracy level. The selected display strategy may select virtual objects to display and/or specify how to display the virtual objects. Thus, a virtual object may be positioned according to a first display strategy given a first localization accuracy level but positioned according to a second display strategy given a second localization accuracy level.

In some implementations, notifications (e.g., feedback) are provided in response to determining a condition causing inaccuracy in the localization of the electronic device. A condition causing inaccuracy may be associated with a semantic label. For example, a semantic label such as "too fast" may be associated with a condition in which the electronic device is being moved too quickly to enable capture of data from which location can be determined with a particular level of accuracy. In another example, a semantic label such as "too dark" may be associated with a condition in which the lighting in the physical environment is insufficient to enable capture of data from which location can be determined with a particular level of accuracy. In some implementations, the accuracy of localization (e.g., centimeter-level accuracy, room-level accuracy, and building-level accuracy) and the condition (e.g., too fast, too far, too dark, etc.) are determined and used to provide an appropriate notification to a user of the electronic device (e.g., "too fast, please slow down", "too far, please move closer", "too dark, please turn on a light", etc.). In some implementations, the notification enables an electronic device user to improve the localization. In some implementations, the notification enables the electronic device user to improve sensor data used in determining the localization.

In general, one innovative aspect of the subject matter described in this specification can be embodied in methods that include the actions of performing a localization of an electronic device within a physical environment, the localization based on sensor data obtained by the electronic device. Then, an accuracy of the localization is determined, and a display strategy based on the accuracy of the localization is determined. In some implementations, a view of an extended reality (XR) environment is provided in which virtual objects are positioned according to the display strategy.

In general, one innovative aspect of the subject matter described in this specification can be embodied in methods that include the actions of performing a localization of an electronic device within a physical environment, the localization based on sensor data obtained by the electronic device. Then, a condition causing inaccuracy in the localization is determined. In some implementations, a view of an extended reality (XR) environment is provided, wherein the inaccuracy in the localization affects the inclusion of virtual objects in the view of the XR environment. Then, a notification is provided at the electronic device based on the condition causing inaccuracy in the localization.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
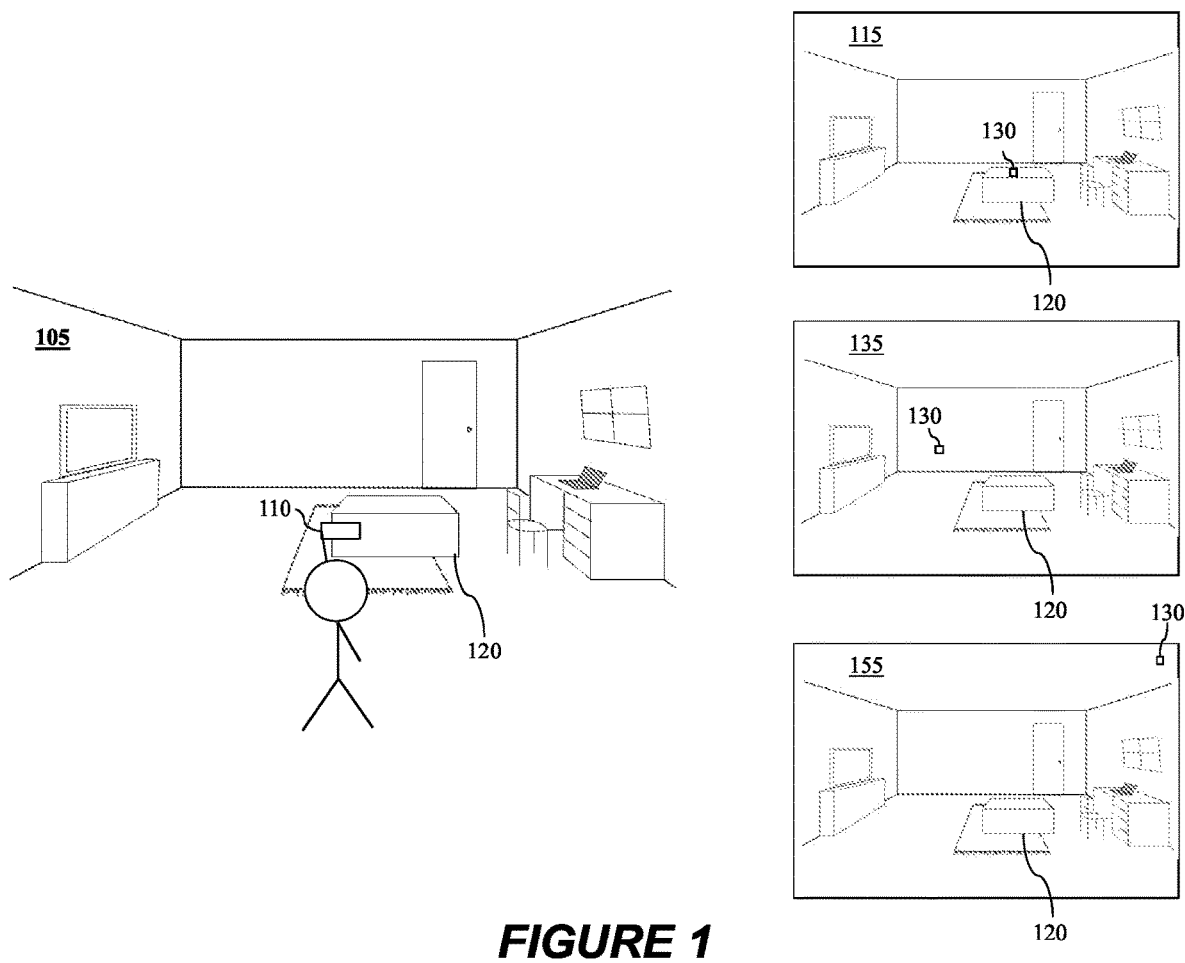
FIG. 1 illustrates an electronic device within a physical environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an electronic device 110 within a physical environment 105. The physical environment 105, in this example, is an office, within a house, within a neighborhood, within a city, etc. Accordingly, the physical environment 105 includes the proximate visible environment as well as surrounding portions of the physical world. The electronic device 110 is configured to display views (e.g., views 115, 135, 155) of an XR environment that include images of (or are otherwise generated based on images and/or other sensor data of) the physical environment 105. For example, at least a portion of such an XR environment may include a live video feed of the physical environment 105 obtained via an image sensor of the electronic device 110. In some implementations, the electronic device 110 is any suitable device for generating and displaying an XR environment such as a smart phone, tablet, or wearable device.

In FIG. 1, the XR environment includes virtual content (e.g., virtual sticky note 130) that is specified to appear at a specific location relative to the physical environment 105 (e.g., at the center of a top surface of table 120, within a particular room, of a particular house, within a particular neighborhood, within a particular city, etc.) and/or may be associated with specific environmental or geographic areas, e.g., a coordinate location, a room, a building, a neighborhood, a city, etc. The virtual content (i.e., virtual sticky note 130) is displayed relative to a view of the physical environment 105 and thus is displayed based on localizing the electronic device 110 within the physical environment 105. The location of the electronic device 110 may be determined using various techniques, e.g., computer vision-based localization, visual odometry-based localization, simultaneous localization and mapping (SLAM), visual inertial odometry (VIO)-based localization, map-based localization, plane detection-based localization, etc. Localization may be based on sensor data, e.g., image data, depth data, motion data, audio data, etc.

If the location of the electronic device 110 is inaccurate, attempting to position the virtual sticky note 130 according to a single, universal display strategy may result in undesirable results. For example, given a single, universal display strategy to position virtual content at a specific location relative to an identified object of the physical environment, the virtual sticky note 130 may always be positioned by attempting to position it on the center of a top surface of the table 120. However, doing so accurately depends upon being able to accurately locate the electronic device's location relative to the table 120 in the physical environment 105. This may result in undesirable inaccuracies in circumstances where the location of the electronic device 110 is not accurately determined. For example, the view 115 is based on a relatively accurate localization of the electronic device 110 and thus positions the virtual sticky note 130 accurately at the center of the surface of the table 120. In contrast, the view 135 is based on a relatively inaccurate localization of the electronic device 110 and thus positions the virtual sticky note 130 at a different location in mid-air away from the table 120. It may be undesirable to display the virtual sticky note 130 in this way.

In some implementations, the positioning of virtual content such as the virtual sticky note 130 within an XR environment is based upon the accuracy of localizing the electronic device 110 within the physical environment 105. Thus, given accurate localization of the electronic device 110, the virtual sticky note 130 may be positioned according to a first display strategy, as illustrated in the view 115. However, given a less accurate localizing of the electronic device 110, rather than positioning the virtual sticky note 130 using the same display strategy as in the view 135, the virtual sticky note 130 is positioned according to a second (i.e., different) display strategy, as illustrated in view 155. Using this second display strategy, the virtual sticky note 130 is positioned in a fixed position on a display of the electronic device 110, i.e., in the upper right corner in the view 155. Such positioning may be preferable to the mid-air positioning of the view 135.

Accordingly, in some implementations, a display strategy is selected for virtual content based on the accuracy of localizing the electronic device 110 within the physical environment 105. The selected display strategy may adjust which virtual objects are displayed (e.g., one virtual object, only virtual objects within a particular room, only virtual objects within a particular building, etc.) and/or how to display the virtual objects (e.g., world-locked, position-oriented, display-locked, etc.).

The accuracy of localization may be classified using a plurality of localization accuracy levels (e.g., a first localization accuracy level, a second localization accuracy level, a third localization accuracy level, etc.). The level of accuracy may correspond to a size, scale, or measurement of the accuracy of the localization, e.g., centimeter-level accuracy, room-level accuracy, building-level accuracy, etc. An accuracy level may correspond to an accuracy range, e.g., centimeter-level accuracy may correspond to circumstances in which accuracy is estimated to be within a range of x centimeters to y centimeters, etc.

In some implementations, localization of the electronic device 110 involves determining a pose of the electronic device 110 within the physical environment 105. The phrase "pose," as used herein, refers to the location and orientation of an object, such as an electronic device, within a physical environment. In some implementations, the localization includes a 6 degrees of freedom (DOF) location (namely a 3D position in 3D space (e.g., position along x, y, and z axes) and orientation in the 3D space (e.g., rotations around the x, y, z axes, respectively)) of the electronic device 110 in the physical environment 105.

Various display strategies may be used to display virtual content based on localization accuracy. FIGS. 2A-2B and 3A-3F illustrate several exemplary display strategies for displaying virtual content. In other implementations, alternative, altered, or otherwise different display strategies may be employed.

Figure 2A:
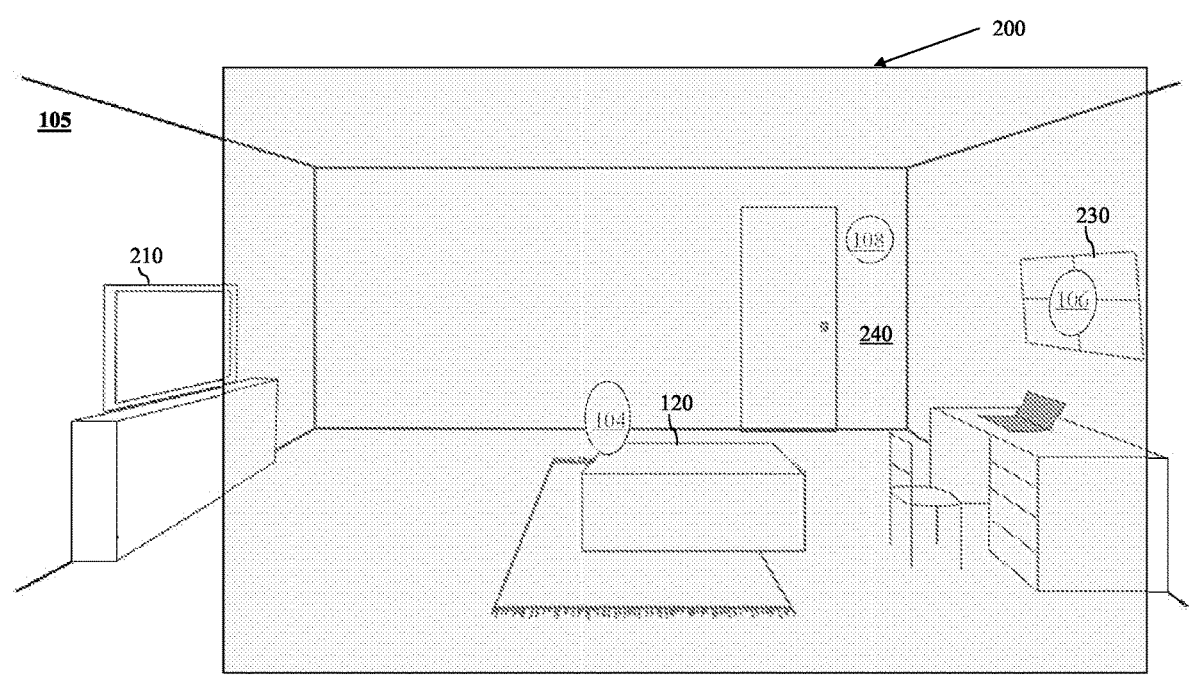
FIGS. 2A-2B illustrate a display strategy for displaying virtual content in accordance with some implementations.
Figure 2B:
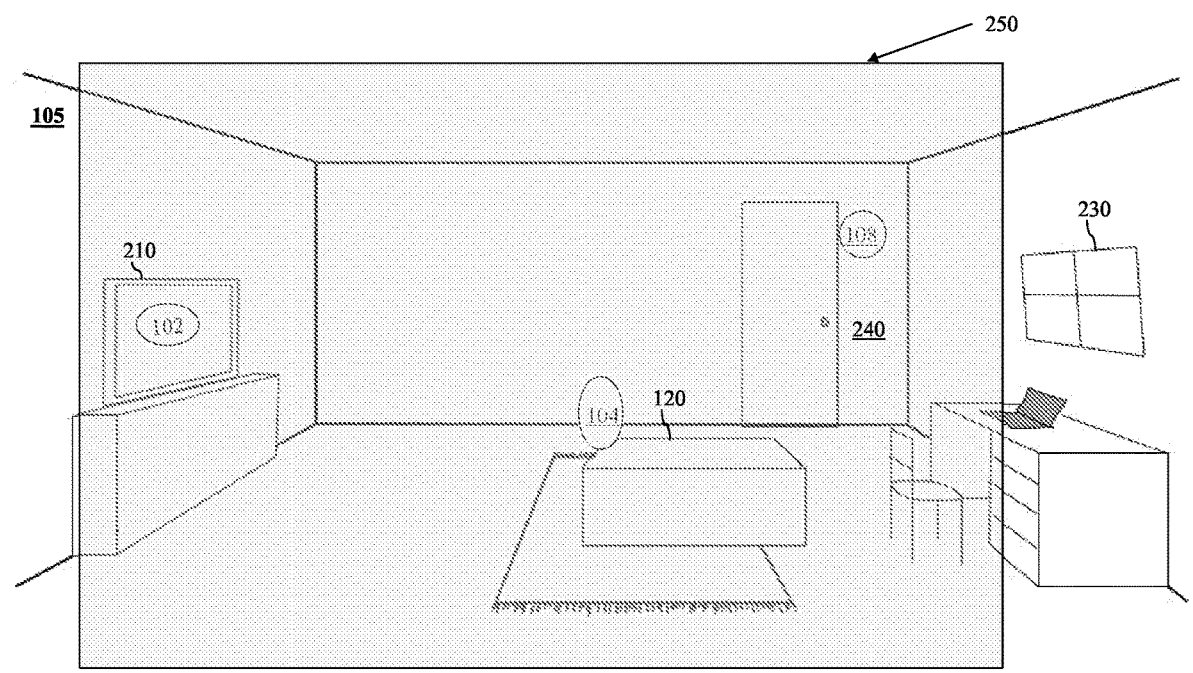

FIGS. 2A-2B illustrate a world-locked display strategy in which virtual content is displayed at a fixed position relative to the physical environment 105. In this example, four virtual objects 102, 104, 106, 108 are specified to appear at positions relative to certain physical objects within the physical environment 105. The entertainment virtual object 102 may provide access to a TV station guide, a current recording status for the TV, a selectable list of available content providers, etc. Accordingly, the entertainment virtual object 102 has been placed in the middle of TV screen 210, parallel to the TV screen 210 and facing a center of the office. A home control virtual object 104 may provide access to lighting controls, temperature controls, security controls (e.g., front door camera, voice communications and locks), etc. The home control virtual object 104 is placed in the middle of a left edge of table 120, facing the device 110. A weather virtual object 106 may provide current or future weather conditions outside the house or access to weather conditions for other locations. Accordingly, the weather virtual object 106 is placed in the center of an exterior window 230, parallel with the window 230 and facing into the office. A reminder virtual object 108 may include an appointment, an alarm, or access to a calendar. The reminder virtual object 108 is placed at a head-level height on a wall 240 to the right of the door and parallel with the wall 240 and facing into the office. Accordingly, the reminder virtual object 108 is likely to be seen just before leaving the office.

The virtual objects 102, 104, 106, 108 are displayed using a world-locked display strategy based on a relatively high localization accuracy. Accordingly, the virtual objects 102, 104, 106, 108 are displayed at fixed positions relative to associated objects in the physical environment 105. As shown in FIGS. 2A-2B, the virtual objects 102, 104, 106, 108 are visible only when the corresponding locations of the physical environment 105 are within the view of the display of the electronic device 110. For example, in view 200 of FIG. 2A, the TV screen 210 is not visible and thus the entertainment virtual object 102, which is positioned at a world-locked position on the TV screen 210, is also not visible. However, when the display of the electronic device 110 turns to the left as shown in view 250 of FIG. 2B, the TV screen 210 and the entertainment virtual object 102 are visible. However, the weather virtual object 106, which is world-locked to the exterior window 230 is no longer visible in the view 250.

Figure 3A:
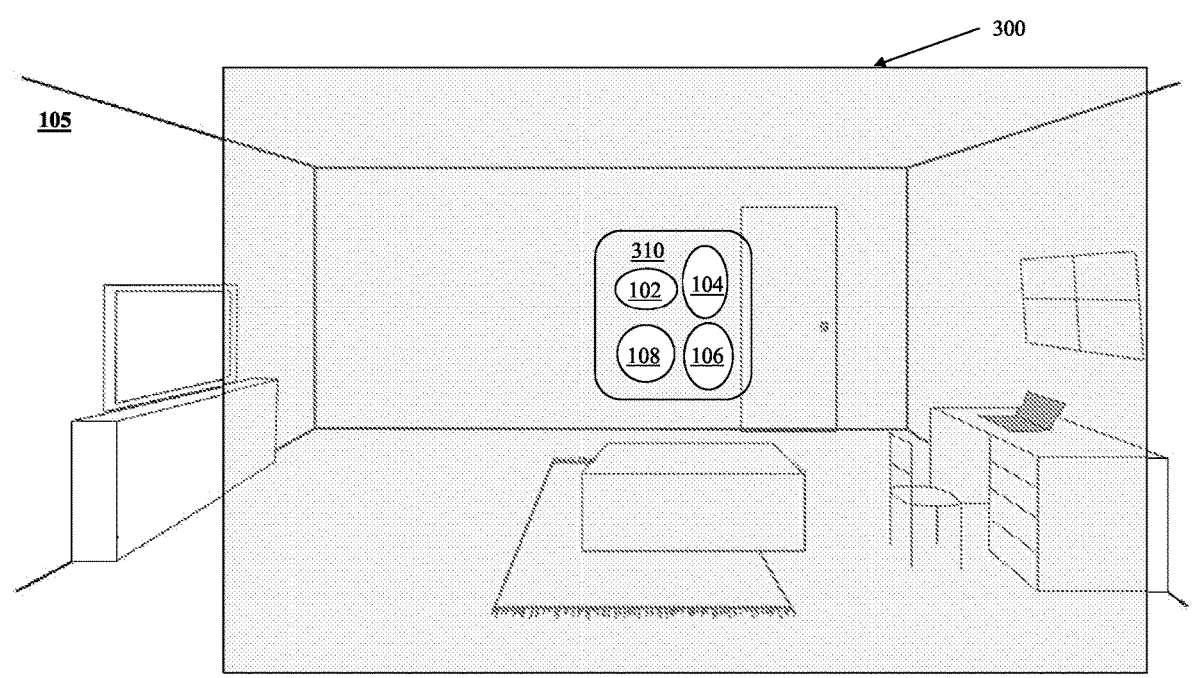
FIGS. 3A-3F illustrate other display strategies for displaying virtual content in accordance with some implementations.
Figure 3B:
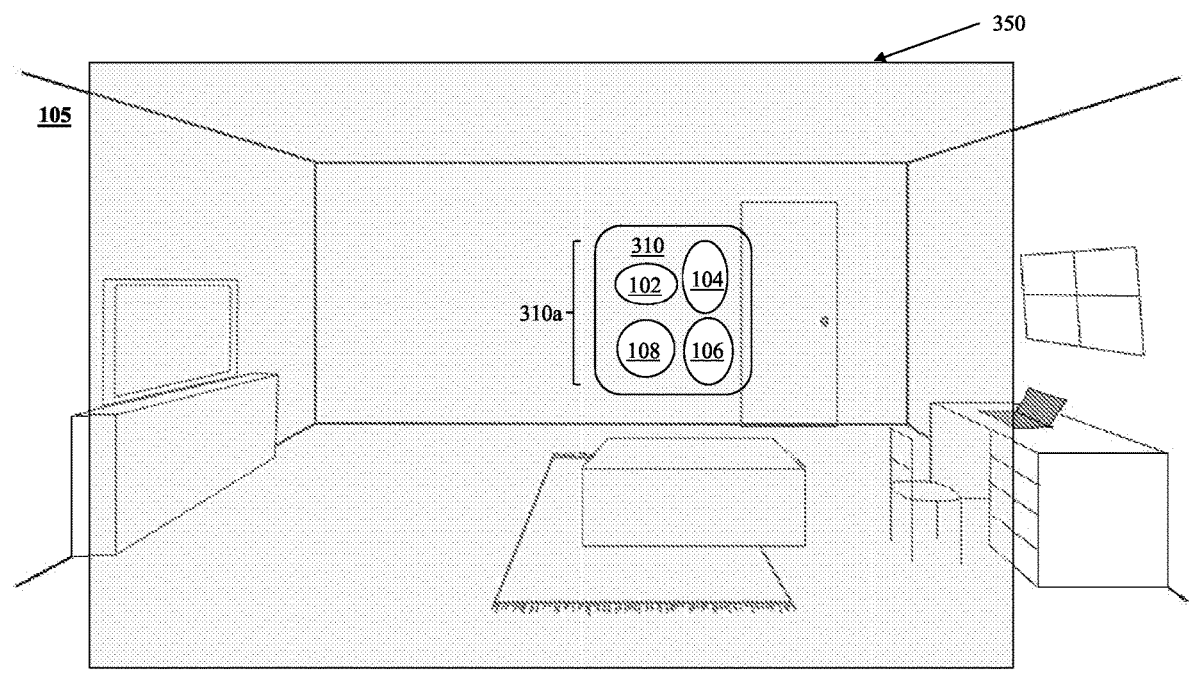

FIGS. 3A-3B illustrate a position-oriented display strategy that positions virtual content at a fixed position relative to an initial position of the electronic device 110. For example, virtual content may be positioned at a given height at a given distance in front of the initial position of the electronic device 110. As shown in FIG. 3A, in view 300, the four virtual objects 102, 104, 106, 108 are positioned in an arrangement 310 that is positioned 2 meters high and 1 meter in front of the initial position of the electronic device 110 (e.g., the location of the electronic device 110 when the position-oriented display strategy was initiated). Accordingly, when the electronic device 110 moves, the virtual objects 102, 104, 106, 108 remain positioned and oriented at the same position relative to the initial position of the electronic device 110. As shown in FIG. 3B, when the display of the electronic device 110 turns/moves to the left (e.g., the user turns their head to the left), the view 350 shows the arrangement 310 of the virtual objects 102, 104, 106, 108 staying displayed at the position 1 meter high and 1 meter in front of the electronic device's 110 initial position. In some implementations, the position-oriented display strategy is used in specific localization accuracy conditions, e.g., when there is no 3D position information but only rotational information about x, y, z axes for the localization of the electronic device 110.

In FIGS. 3A-3B arrangement 310 organizes multiple virtual objects in a particular format, e.g., a grid of icons. In some implementations, virtual objects that are related to one another are organized together in an arrangement using a format that provides a uniform, organized, or otherwise desirable organization. Virtual objects may be determined to be related to one another based on being associated with a same positioning reference in the physical environment 105, e.g., being associated with the same physical object, room, building, neighborhood, city, etc. In some implementations, the virtual contents of a room is considered a "room set". For example, the room set of virtual content can be a set of virtual objects or widgets that are associated with a specific room within a building of a physical environment. Association between the virtual content (e.g., the "room set") and the room can be established based on historical usage by one or more devices, pre-programming, initialization, and the like.

The graphical format of an arrangement for related virtual objects (e.g., virtual objects within the same room set) could be a single row, a single column, a circle, a 2D array, etc. In some implementations, a virtual object in an arrangement of virtual objects may have a distinguishing appearance. For example, a virtual object that is often used may be displayed using a bigger size in an arrangement than other virtual objects in the arrangement. Alternatively, the display size and place in the arrangement may depend on the creation date of the content (e.g., recent content may be shown larger).

Figure 3C:
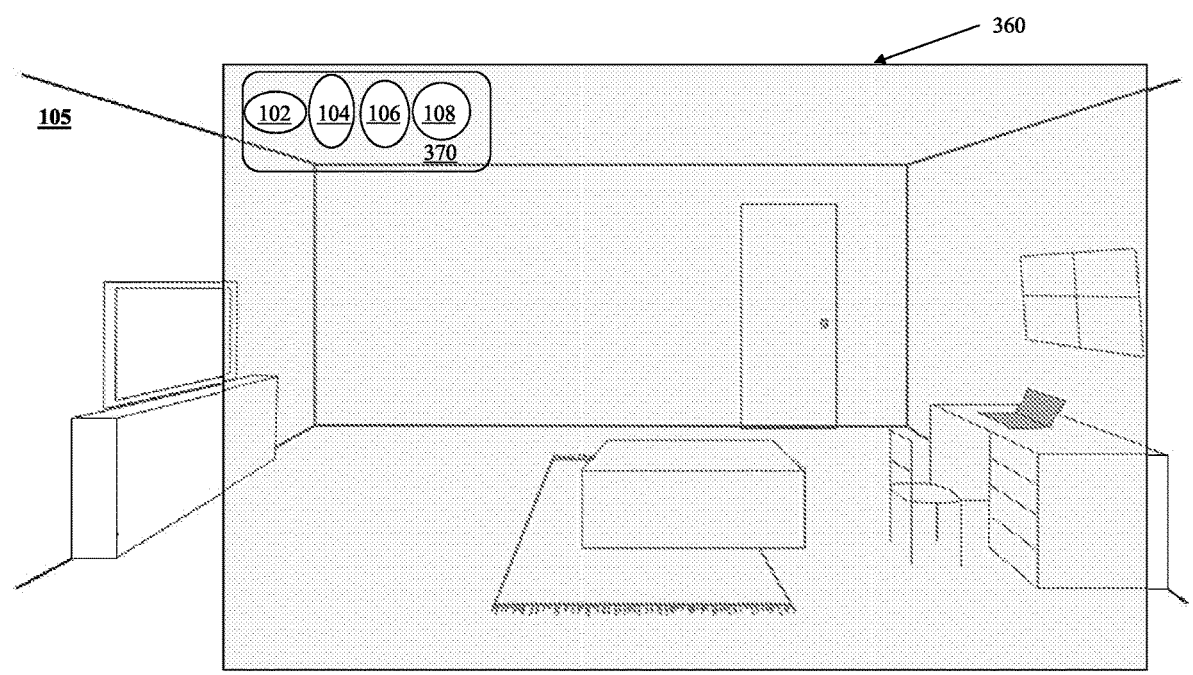
Figure 3D:
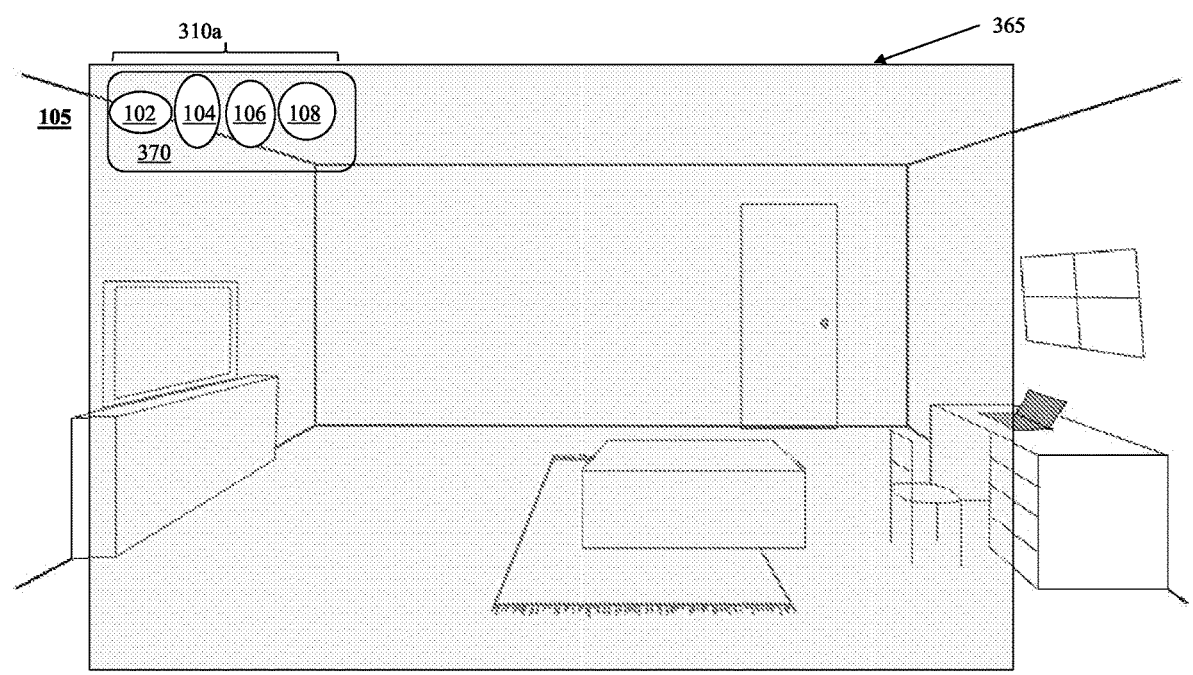

FIGS. 3C-3D illustrate a display-locked display strategy in which virtual content is positioned at a fixed position on the display of the electronic device 110. As shown in FIG. 3C, in view 360 the four virtual objects 102, 104, 106, 108 are positioned in an arrangement 370 that is displayed locked in an upper left corner of the display of the electronic device 110. As shown in FIG. 3D, in view 365, after the display has turned/moved to the left relative to the view 360 of FIG. 3C (e.g., the user turns their head to the left), the fixed arrangement 370 of the virtual objects 102, 104, 106, 108 has moved with the electronic device, i.e., the virtual objects 102, 104, 106, 108 remain in the same positions on the display of the electronic device 110.

As illustrated in FIGS. 1, 2A-B, and 3A-D, various implementations disclosed herein include devices, systems, and methods that use information about localization accuracy to select display strategies for virtual content displayed in an XR environment. The world-locked display strategy, the position-oriented display strategy, and the display-locked display strategy have been described; however, the application is not intended to be so limited as alternative and/or additional display strategies may be used.

In some implementations, the accuracy of localization is determined to be amongst a plurality of localization accuracies (e.g., a first localization accuracy, a second localization accuracy, a third localization accuracy, etc.) and a display strategy (e.g., world-locked, position-oriented, display-locked, etc.) is selected based on the determined localization accuracy. In some implementations, the accuracy of localization is determined amongst a plurality of localization accuracies that are set based on distance thresholds relative to the localization accuracy of the electronic device. For example, determining a localization accuracy may include determining a level of accuracy from a plurality of levels of accuracy. For example, a first level of accuracy is selected when localization accuracy is less than +/−10 centimeters (e.g., a first threshold). A second level of accuracy is selected when localization accuracy is between the first threshold and +/−5 m (e.g., a second threshold). A third level of accuracy is selected when localization accuracy is between the second threshold and +/−25 m (e.g., a third threshold), and so on. As described herein, the first, second, and third thresholds for localization accuracy are described using specific example values for illustration only, and actual values used for each of the thresholds may be different values. More than three levels of localization accuracies may be used. Further, the plurality of levels of localization may be determined based on the specific application, determined experimentally, arbitrarily, etc. In some implementations, the plurality of levels of accuracy are determined semantically.

In one implementation, a first localization accuracy is called "centimeter-level accuracy," a second localization accuracy is called "room-level accuracy," and a third localization accuracy is called "building-level accuracy." Building-level accuracy has less localization accuracy than the room-level accuracy, which has less localization accuracy than the centimeter-level accuracy. Centimeter-level localization accuracy may be a level of accuracy that is considered sufficient to display virtual content relative to a particular reference position within a physical environment. Centimeter-level accuracy may be determined when localization accuracy is less than a threshold distance, e.g., 1 centimeter, 2 centimeters, 5 centimeters, 10 centimeters, 20 centimeters, etc. Room-level accuracy may be a level of accuracy that is considered sufficient to display virtual content relative to a particular room within a physical environment. Room-level accuracy may be determined when localization accuracy is worse than centimeter level accuracy but better than a threshold, e.g., 1 meter, 2 meters, 4 meters, 7 meters, etc. Building-level accuracy may be a level of accuracy that is considered sufficient to display virtual content relative to a particular building within a physical environment. Building-level accuracy may be determined when localization accuracy is worse than room-level accuracy but better than has another threshold, e.g., 30 meters, 45 meters, etc.

The virtual content selected to be included within an XR environment may depend upon localization accuracy, e.g., whether there is centimeter-level accuracy, room level accuracy, or building level accuracy. Certain sets of virtual objects may be displayed based on the localization accuracy. For example, virtual objects may be associated with one another in sets based on areas of the physical environment with which they are associated. All of the virtual objects associated with a kitchen may be associated with the kitchen set of virtual content, all of the virtual objects associated with a home office may be associated with a home office set, and all of the virtual objects associated with both the kitchen and the home office may be associated with a home set. If the location accuracy is centimeter-level accuracy, then virtual objects may be displayed based on specific physical object association within the physical environment. If the location accuracy is room-level accuracy and the electronic device is within the kitchen, then the virtual objects in the kitchen set may be selected for display. If the location accuracy is building-level accuracy and the electronic device is within the home, then the virtual objects in the home set may be selected for display.

An arrangement for displaying multiple virtual objects from a given set may have a format that provides a uniform, organized, or otherwise desirable appearance. As examples, an arrangement may provide a single row, a single column, a circle, or a 2D array of the virtual objects associated with a set. In some implementations, the size and the position of the virtual objects in the arrangement is adjusted based on usage frequency, user preferences, or other properties.

Localization accuracy of the electronic device may be used to set or adjust a display strategy for the virtual content. For example, when the estimated localization accuracy is centimeter-level accuracy, virtual content may be displayed using the world-locked display strategy. FIGS. 2A-2B illustrate an instance where the electronic device 110 has centimeter-level accuracy, and the virtual objects 102, 104, 106, 108 are displayed in a 6 DOF world-locked display strategy.

When the estimated localization accuracy is room-level accuracy, virtual content may be displayed using the position-oriented display strategy or the display-locked display strategy. FIGS. 3A-3B illustrate an instance where the electronic device 110 has room-level accuracy, and a room set 310a of the virtual objects 102, 104, 106, 108 are displayed using a position-oriented display strategy. FIGS. 3C-3D illustrate an instance where the electronic device 110 has room-level accuracy, and the room set 310a of the virtual objects 102, 104, 106, 108 are displayed using a display-locked display strategy.

Figure 3E:
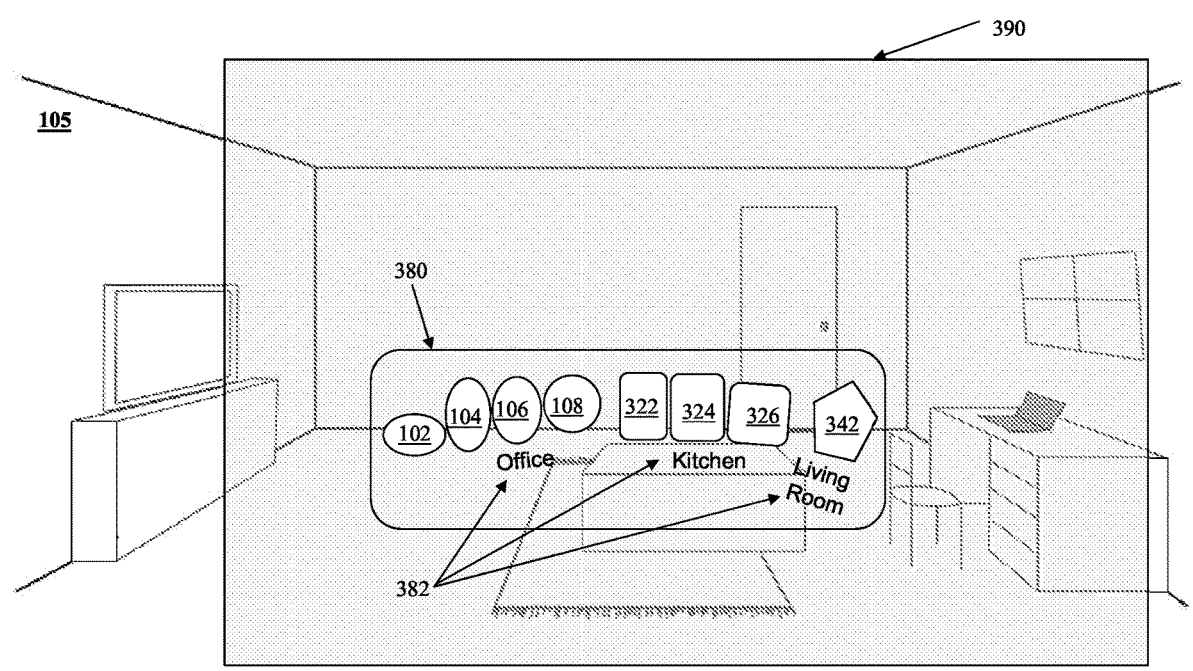
Figure 3F:
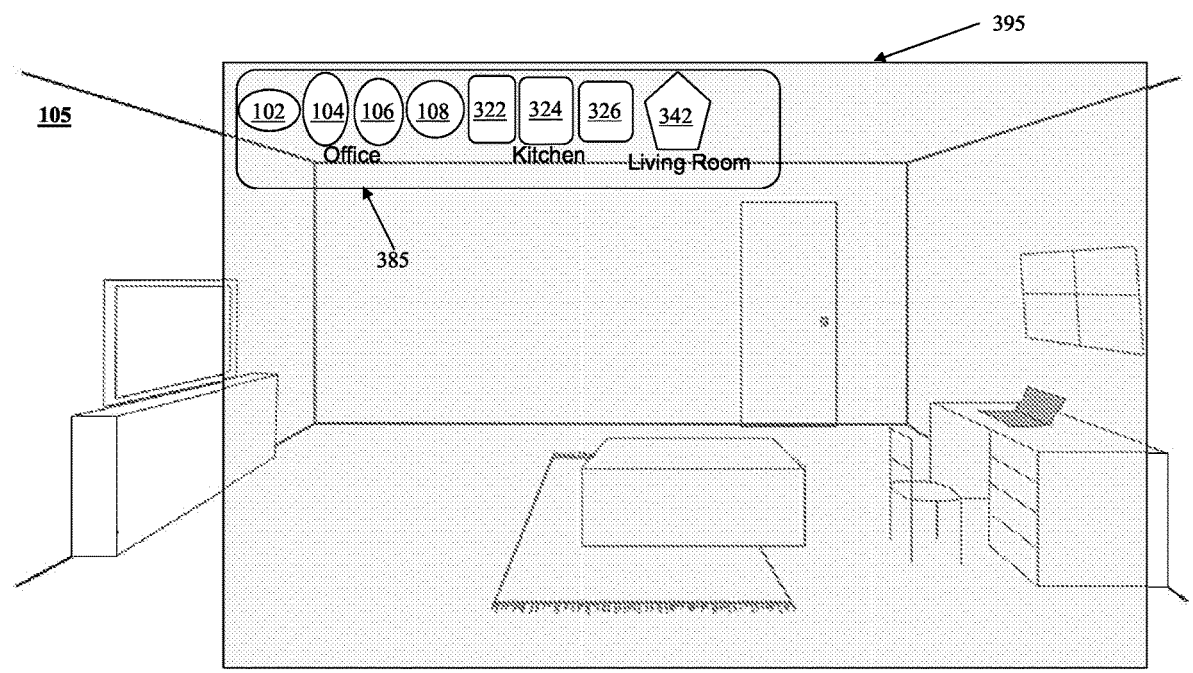

When the estimated localization accuracy is "building-level accuracy", virtual content may be displayed using the position-oriented display strategy or display-locked display strategy. As shown in FIGS. 3E-3F, arrangements 380, 385 include virtual objects from a building set of virtual content. The building set includes the virtual objects 102, 104, 106, 108 (e.g., from the office) and additional virtual objects 322, 324, 326, 342 from different rooms of the building containing the electronic device 110. In one example, the building set includes labels 382 identifying the room containing the virtual objects. As shown in FIGS. 3E-3F, the virtual objects 322, 324, 326 are from the kitchen and the virtual object 342 is from the living room.

FIG. 3E shows an instance where the electronic device 110 has building-level accuracy, and the arrangement 380 is displayed in view 390 using a position-oriented display strategy (e.g., arranged in a single slightly curving arc). FIG. 3F shows an instance where the electronic device 110 has building-level accuracy, and the arrangement 385 is displayed in view 395 using a display-locked display strategy.

In these examples, three levels of localization accuracy of the electronic device 110 and the world-locked display strategy, the position-oriented display strategy, and the display-locked display strategy were used. However, various implementations are not intended to be so limited as more/additional levels of localization accuracy associated with alternative different display strategies may be used.

If a room set or a building set contains a large number of virtual objects, the display of the electronic device 110 may appear cluttered. Accordingly, in some implementations, when a room set or a building set is greater than a prescribed number (e.g., 5, 10, 25, 50, 100), the virtual objects in the room set or the building set may be presented using a representation. For example, topically-related virtual objects (e.g., entertainment-type virtual objects, social-type virtual objects, etc.) may be presented as a single representation. The individual virtual objects may be provided in response to the representation being selected. In one example, each such representation depicts a number representing the number of consolidated virtual objects. Using a representation of multiple virtual objects may improve a user experience by de-cluttering the display.

In some implementations, additional or alternative strategies for displaying virtual content based on a localization accuracy of an electronic device are used. As examples, "observable world-locked", "scaled world-locked", and "floating world-locked" display strategies may be used.

Figure 4A:
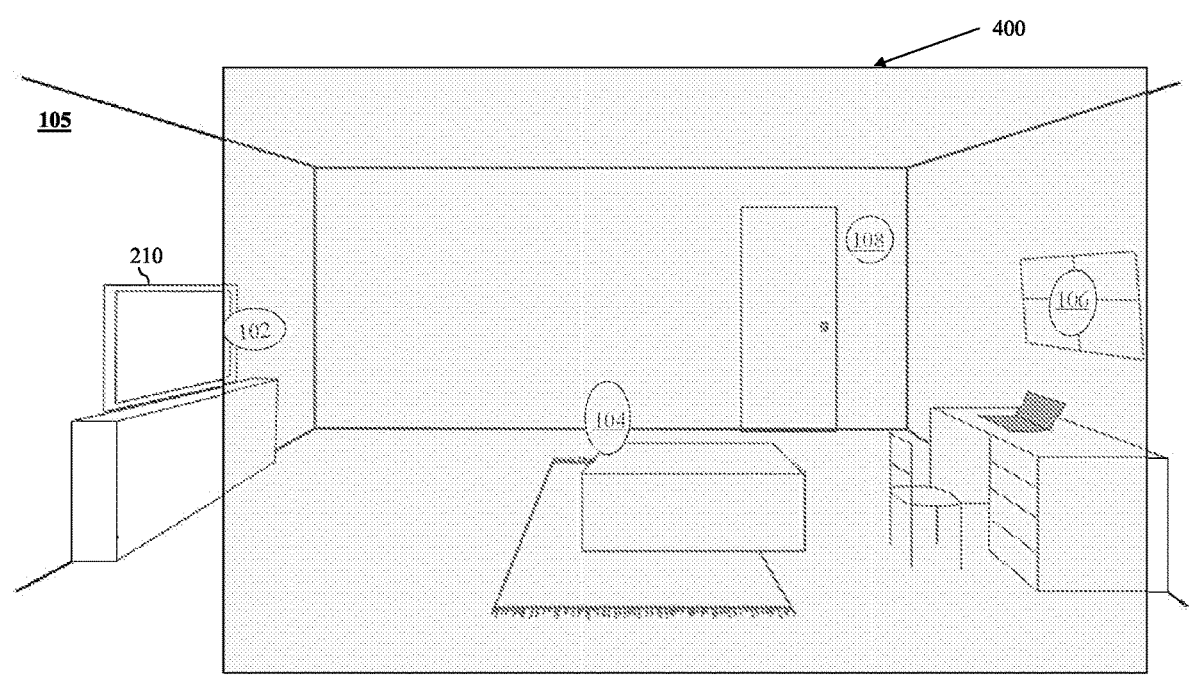
FIGS. 4A-4B illustrate another display strategy for displaying virtual content using an electronic device in accordance with some implementations.
Figure 4B:
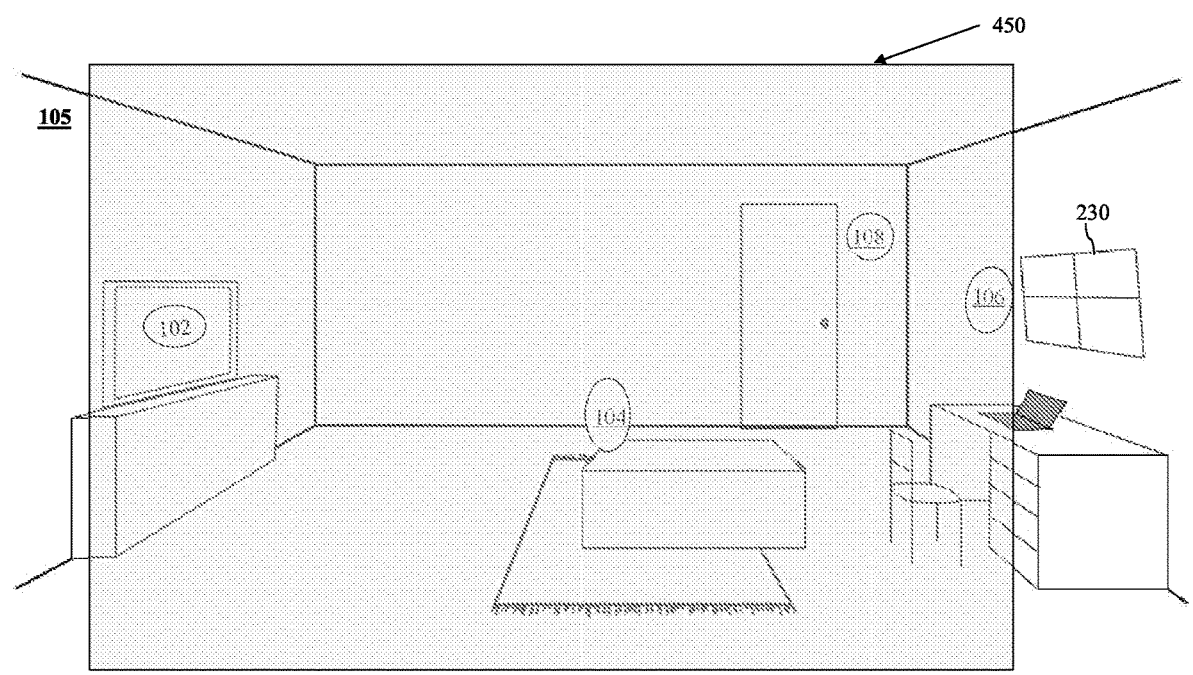

The "observable world-locked" display strategy displays all virtual content associated with an area (e.g., a room) in such a way that the virtual content associated with physical locations within the view are displayed based on their associated physical locations and virtual content associated with physical locations outside of the view are displayed in observable positions based on their associated physical locations. The observable positions may be determined by minimizing a distance (e.g., Euclidean distance, angle, etc.) to an associated physical object or location in the physical environment 105. As shown in FIGS. 4A-4B, all the virtual objects 102, 104, 106, 108 remain visible in views 400, 450 using the "observable world-locked" display strategy. The virtual objects 102, 104, 106, 108 are shown in the view 400 based on identifying display positions proximate to (e.g., as close as possible to) their associated objects. Specifically, the virtual object 102 is associated with the TV screen 210 and, in this example, is displayed as close as possible within the view 400 to its associated position on the TV screen 210. Similarly, the virtual object 106 is associated with the window 230 and is displayed as close as possible within the view 450 to its associated position on the window 230.

The "scaled world-locked" display strategy displays virtual content world-locked but with an indication or characteristic that is based on the localization accuracy of the electronic device 110. In one implementation, the size/scale of the virtual object may be adjusted based on the amount of error in the localization. For example, given larger localization error, the displayed size of the virtual object is larger, up to a prescribed amount (e.g., a threshold).

The "floating world-locked" display strategy displays the virtual content world-locked but with movement based on uncertainty for the localization accuracy of the electronic device 110. In one implementation, the virtual content may move (e.g., float, swing, smoothly animate, etc.) around its estimated world-locked position based on the amount of error in the localization. For example, as the localization error gets larger, the displayed amount of movement increases up to a prescribed amount (e.g., the corresponding threshold).

In some implementations, a room set or building set may itself be displayed using an anchor-oriented display strategy. In this case, an anchor is provided based on a localization technique. For example, the anchor may be determined by scene geometry and semantic information. As a specific example, a flat plane detected in the physical environment may be identified by semantic information as a top surface of a table, and the top surface of the table may be used to position (e.g., anchor) the room set or building set. In other words, the building set may be arranged on top of the identified table and remains there as the electronic device 110 user changes location in the physical environment 105 (assuming a sufficient level of localization accuracy).

Various implementations disclosed herein include devices, systems, and methods that use information about localization accuracy to select display strategies for virtual content displayed in an XR environment. In some implementations, information used to determine the localization accuracy is obtained using data from sensors on an electronic device. For example, information about the localization accuracy could be determined from GPS, local area networks, hotspots, user input, depth sensors, motion sensors (e.g., an inertial measurement unit (IMU)), sensors of different quality (e.g., different resolution of image sensors, frequency for IMU data, etc.), a plurality of one or more sensor types and their corresponding positions (e.g., an array of sensors providing directional or 360° coverage around the electronic device).

Various techniques may be used to determine localization accuracy. In some implementations, the sensor data (e.g., images, depth data, motion data, etc.) that is used for localization is evaluated to determine localization accuracy and/or a source or cause of inaccuracy. In some implementations a machine learning model is trained and used to determine localization accuracy and/or a source or cause of inaccuracy given the sensor data input that is used for localization. The machine learning model may be a deep learning model, a neural network (e.g., a CNN), decision tree, adaptive boosting model, or the like.

Figure 5:
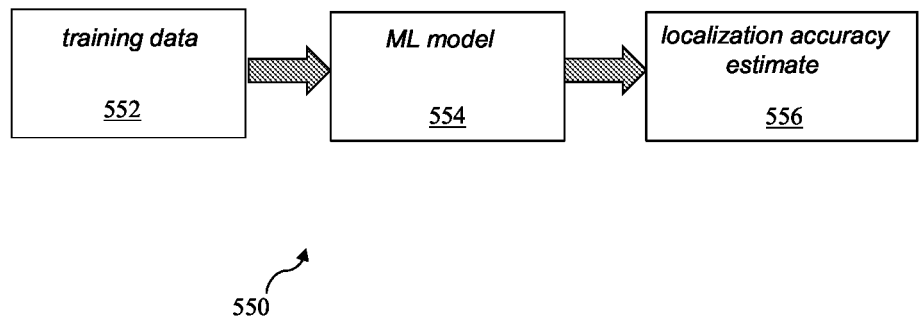
FIG. 5 illustrates an exemplary method to determine a localization accuracy estimate of the electronic device within a physical environment in accordance with some implementations.

FIG. 5 illustrates a high-level training process 550 in which training data 552 is used to train machine learning model 554 to provide a localization accuracy estimate 556. Training data 552 may include images and associated electronic device localization information to be used as ground truth data. Such localization information may be determined in alternate ways. The machine learning model 554 may compare a calculated localization (e.g., from SLAM, VIO, etc.) with the ground truth localization information to train the machine learning model 554. In some implementations, the training of the machine learning model 554 uses training error loss based on the error between the estimated pose and the ground truth pose in the training data 552. For example, the pose may be 6 DOF pose, a 4 DOF pose, a 3D position, or the like and the error loss may be a position error, an angular error, or the like. In some implementations, the machine learning model 554 may be trained to use historical data related to localization accuracy from specific physical locations.

The localization accuracy estimate 556 output by the machine learning model 554 may provide an accuracy level, e.g., centimeter level accuracy, room level accuracy, etc. In some implementations, the localization accuracy estimate 556 includes a numerical representation of an amount of accuracy. For example, the localization accuracy estimate 556 may use a binary (0/1) representation or a continuous (0-1) representation. In other implementations, the localization accuracy estimate 556 is an estimated accuracy using a continuous scalar range (e.g., 2 cm, 120 cm), using binned scalar ranges (e.g., 1-5 cm, 6-20 cm, 1-2 m, 5-10 m), or the like. In some implementations, the localization accuracy estimate 556 is a specific amount of uncertainty (e.g., +/−6 m) that is mapped to a display strategy among a plurality of display strategies. In some implementations, the localization accuracy estimate 556 represents a percentage confidence in the localization of the electronic device.

In some implementations, the electronic device may have insufficient power to perform localization (e.g., to operate an image sensor) and accordingly the localization accuracy might be reduced. In such a situation, the display-locked display strategy, which is usually power efficient, may be activated. Similarly, selected position-oriented display strategies may use power efficient sensors such as a magnetometer or an IMU.

Various implementations disclosed herein include devices, systems, and methods that provide notifications (e.g., feedback) to an electronic device responsive to a condition causing inaccuracy in a localization of the electronic device's position within a physical environment. In some implementations, the technique determines the condition causing inaccuracy based on a semantically-labeled condition such as "too fast", "too dark", etc. associated with the localization. In some implementations, the technique assesses the accuracy of localization (e.g., centimeter-level accuracy, room-level accuracy, and building-level accuracy) and a quality of the semantic condition corresponding to a source or cause of inaccuracy (e.g., too fast, too far, too dark, etc.) and provides the notification to a user of the electronic device (e.g., "too fast, please slow down", "too far, please move closer", "too dark, please turn on a light", etc.). In some implementations, the notification enables the electronic device user to improve the localization. In some implementations, the notification enables the electronic device user to modify sensor data used in determining the localization.

Figure 6:
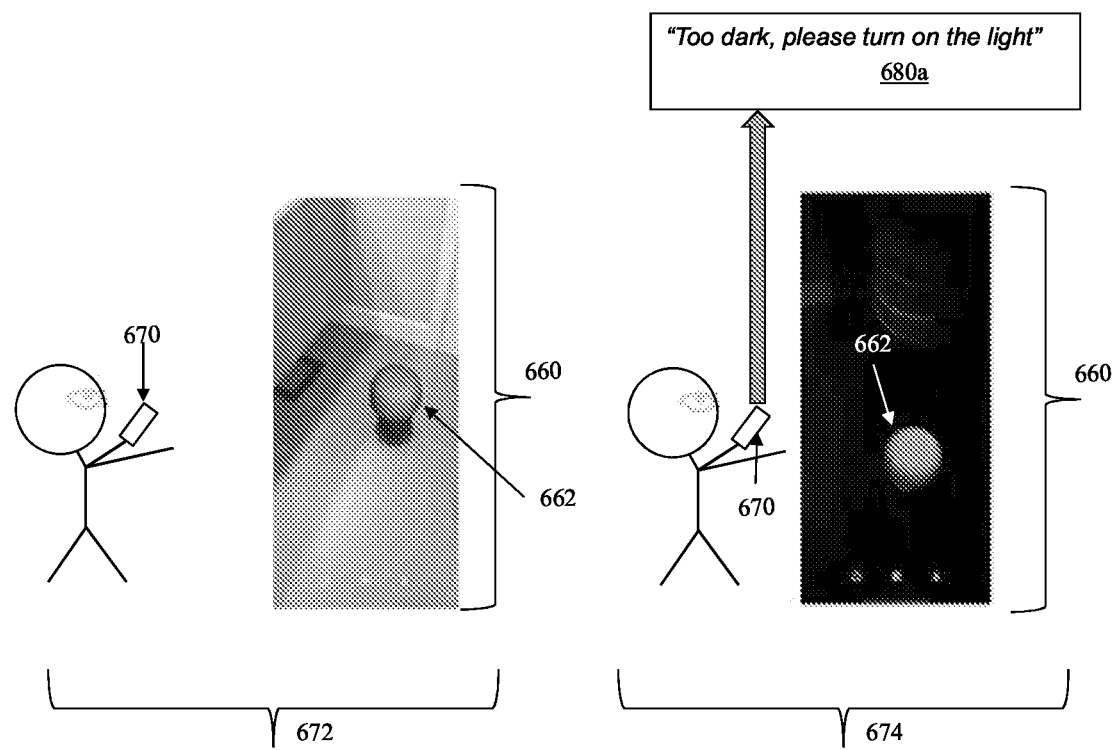
FIGS. 6-7 illustrate a physical environment including virtual content in accordance with some implementations.
Figure 7:
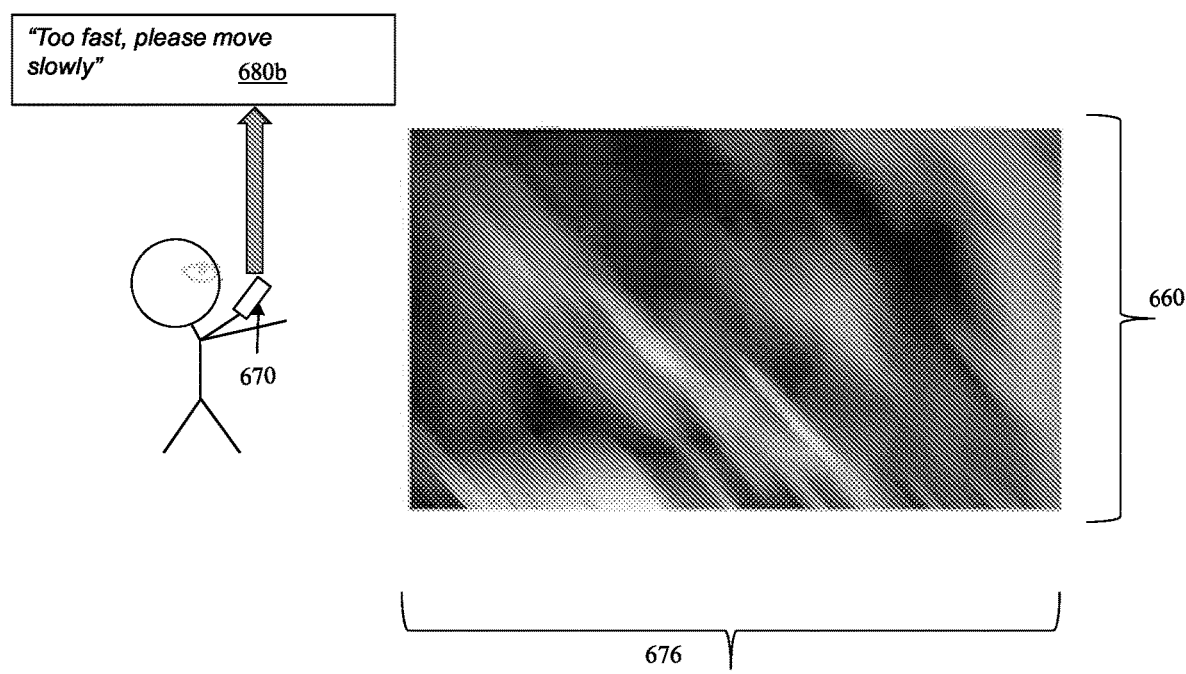

FIGS. 6-7 illustrate providing a notification based on a conditional associated with localization inaccuracy. As shown in FIG. 6, at a first point in time 672, virtual content 662 is displayed using a world-locked display strategy when positioned relative to a physical environment 660 by an electronic device 670 (e.g., based on a centimeter-level accuracy in localization of the electronic device 670 in the physical environment 660). As also shown in FIG. 6, at a second point in time 674, the virtual content 662 cannot be accurately positioned based on a world-locked display strategy because the physical environment 660 is too dark. For example, if the localization of the electronic device 670 was being performed using SLAM or VIO, the image data obtained by the electronic device 670 may be insufficient (e.g., not having enough contrast) to localize the electronic device 670 accurately.

As shown in FIG. 6, the electronic device 670 determines the condition causing the inaccuracy in its localization and outputs a notification 680*a* "Too dark, please turn on the light". In some implementations, the notification 680*a* is visual, audible, haptic, or the like.

As shown in FIG. 7, at a third point in time 676, the virtual content 662 cannot be accurately positioned based on a world-locked display strategy because images of the physical environment 660 are too blurry. For example, if the localization of the electronic device 670 was being performed using SLAM or VIO, the image data obtained by the electronic device 670 may be insufficient (e.g., having too much motion blur) to localize the electronic device 670 accurately. In FIG. 7, the electronic device 670 determines the condition causing the inaccuracy in its localization and outputs a notification 680*b* "Too fast, please move slowly".

A machine learning model may be used to determine a condition causing inaccuracy in electronic device localization. For example, the machine learning model 554 of FIG. 5 could be trained and used predict a source or cause of inaccuracy. In this example, the machine learning model 554 may trained using training data 552 that includes semantic labels associated with a source or cause of inaccuracy (e.g., "too far", "too small", "not enough features", "moving too fast", "too dark", "not enough power", etc.). As examples, the training data 552 may include images rendered to include motion blur with a semantic label "fast" attached, images rendered to include low level or insufficient lighting with a semantic label "dark" attached, and/or images rendered with content features too small to track or consistently detect with a semantic label "too far" attached. Sensor data may be used to generate training data 552. For example, a motion sensor may be used to determine when a training image was captured while the electronic device was moving at more than a threshold speed. As another example, an ambient light sensor may be used to determine when a training image was captured in an environment with less than a threshold amount of lighting.

In some implementations, the machine learning model 554 is a single machine learning model used to generate a location accuracy and a cause or source of location inaccuracy. In some implementations, the machine learning model 554 includes a first machine learning model to generate a localization accuracy and a second machine learning model to generate a cause or source of location inaccuracy. In some implementations, the machine learning model 554 includes a third machine learning model to generate a notification based on a cause or source of inaccuracy.

Figure 8:
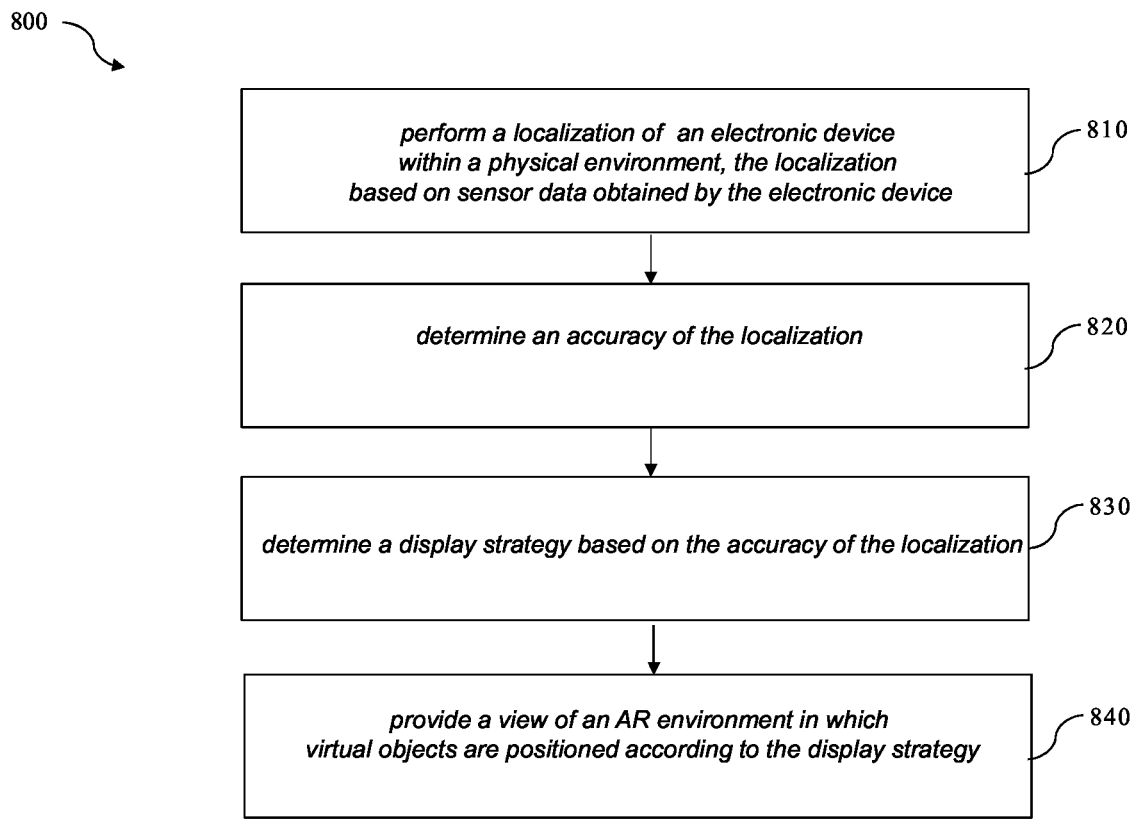
FIG. 8 is a flowchart illustrating an exemplary method of providing an environment in which virtual objects are positioned based on the accuracy of localizing an electronic device within a physical environment in accordance with some implementations.

FIG. 8 is a flowchart illustrating an exemplary method 800 of providing an XR environment in which virtual objects are positioned based on the accuracy of localizing an electronic device within a physical environment. In some implementations, the method 800 is performed by a device (e.g., electronic device 1000 of FIG. 10). The method 800 can be performed using an electronic device or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory). In some implementations, the method 800 is performed by an electronic device having a processor.

At block 810, the method 800 performs a localization of an electronic device within a physical environment. The localization may be based on sensor data obtained by the electronic device. In some implementations, the localization identifies a pose that includes both 3D position and 3 orientations to provide six degrees of freedom of movement (6 DOF) of the electronic device within the physical environment. Alternatively, the pose may include four DOF, three DOF, or 1 DOF. In some implementations, the sensor data includes image data (e.g., computer vision using images of the environment from camera sensors) for use in localization techniques including SLAM, VIO, etc. In some implementations, the sensor data includes motion (e.g., IMU data), depth, and/or location tracking (e.g., GPS data) data in addition to the image data.

At block 820, the method 800 determines an accuracy of the localization. In some implementations, the accuracy of the localization is a measure of confidence in the localization. In some implementations, determining the accuracy includes determining a level of the accuracy of the localization. In some implementations, determining an accuracy includes determining a level of accuracy from a plurality of levels of accuracy. For example, selecting a level of accuracy may be from a plurality of levels of accuracy corresponding to different distance thresholds. For example, levels of accuracy may include centimeter-level accuracy, room-level accuracy, building-level accuracy. In some implementations, accuracy may be assessed using calculated values (e.g., 86% confidence) or thresholds. In some implementations, accuracy may be assessed or determined using one or more machine learning models. In some implementations, a machine learning model is trained using an error loss determined by comparing estimated poses of electronic devices and ground truth poses of electronic devices.

At block 830, the method 800 determines a display strategy based on the accuracy of the localization. In some implementations, the display strategy is selected from a plurality of different display strategies. In some implementations, the display strategy is selected from a world-locked display strategy, a position-oriented display strategy, or a display-locked display strategy. In some implementations, there are four or more display strategies in the plurality of different display strategies.

At block 840, the method 800 provides a view of an XR environment in which virtual objects are positioned according to the display strategy. In some implementations, the display strategy is a world-locked display strategy according to which the virtual objects are positioned at fixed positions relative to a 3D environment corresponding to the physical environment. For example, a weather application virtual object is fixedly positioned using 6 DOF adjacent a window or a door. In some implementations, the display strategy is a position-oriented display strategy according to which the virtual objects are positioned at fixed positions relative to the electronic device. For example, the virtual objects are locked at a position two meters in front and chest high of the electronic device's initial position (e.g., when the position-oriented display strategy was initiated). In some implementations, the display strategy is a display-locked display strategy according to which the virtual objects are positioned at fixed positions on a display of the electronic device. For example, the virtual objects are locked in the upper left corner of the display of the electronic device.

In some implementations, the method 800 determines that the accuracy has changed to a second different accuracy, and based on the accuracy having changed, updates the view of the XR environment to position the virtual objects according to a second display strategy different than the previous display strategy. For example, the previous accuracy could be a greater than 95% confidence, and the second different accuracy is less than 50% confidence. In some implementations, the accuracy is monitored (e.g., repeatedly, intermittently, or continuously) and switches among the plurality of levels of accuracy. When the accuracy is determined to have changed from a first level of accuracy to a second level of accuracy of the plurality of levels of accuracy, the view of the XR environment is updated (e.g., automatically) to position the virtual objects according to a second display strategy (e.g., associated with the second level of accuracy) different than a first display strategy (e.g., associated with the first level of accuracy).

In some implementations, blocks 810-840 are repeatedly performed. In some implementations, the techniques disclosed herein may be implemented on a smart phone, tablet, or a wearable device, such as a head-mounted device (HMD) having an optical see-through or opaque display.

Figure 9:
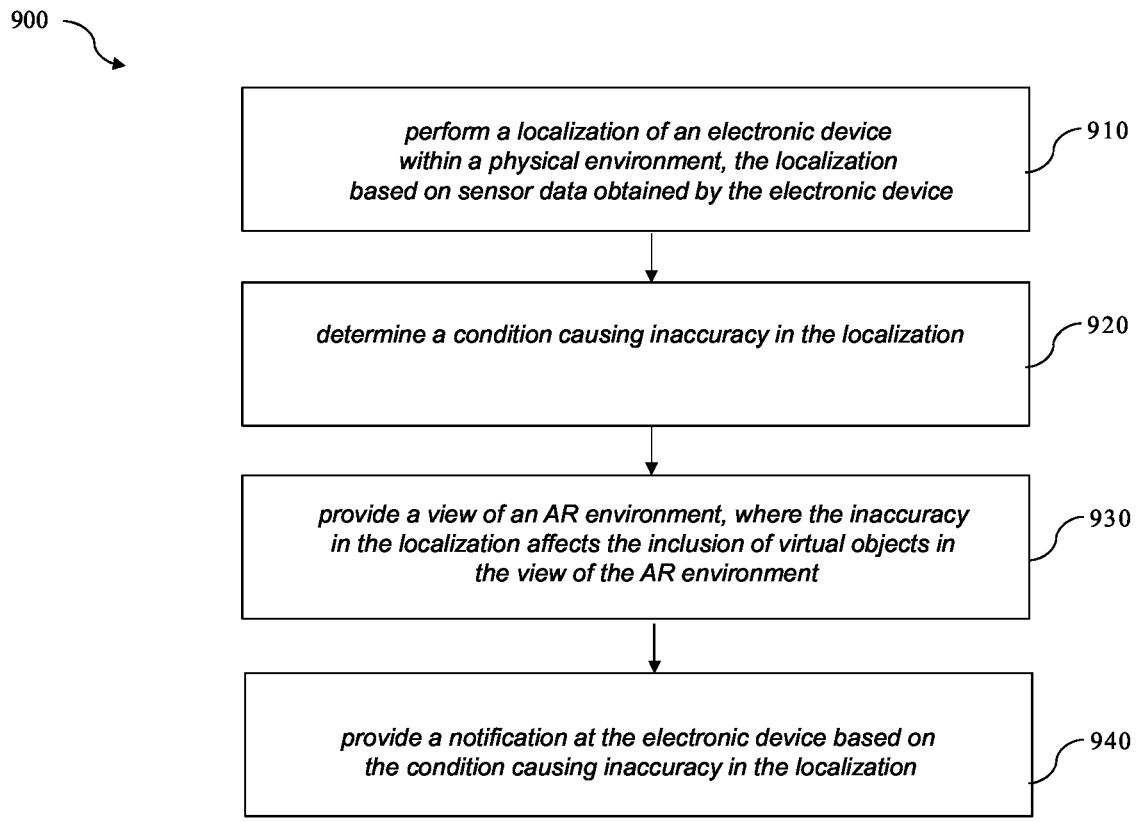
FIG. 9 is a flowchart illustrating an exemplary method of providing a notification responsive to a condition causing inaccuracy in a localization of an electronic device within a physical environment in accordance with some implementations.

FIG. 9 is a flowchart illustrating an exemplary method 900 of providing an XR environment in which virtual objects are positioned based on the accuracy of localizing an electronic device within a physical environment. In some implementations, the method 900 is performed by a device (e.g., electronic device 1000 of FIG. 10). The method 900 can be performed using an electronic device or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory). In some implementations, the method 800 is performed by an electronic device having a processor.

At block 910, the method 900 performs a localization of an electronic device within a physical environment. The localization may be based on sensor data obtained by the electronic device. In some implementations, the localization determines a pose that includes a 3D position and 3 orientations to provide 6 DOF of the electronic device within the physical environment. Alternatively, the pose is less than 6 DOF (e.g., three DOF). In some implementations, the sensor data includes image data (e.g., computer vision using images of the environment from a camera sensor) for use in localization techniques including SLAM, VIO, etc. In some implementations, the sensor data includes motion (e.g., IMU data), depth, and/or location tracking (e.g., GPS data) data in addition to the image data.

At block 920, the method 900 determines a condition causing inaccuracy (e.g., a semantic label for a condition such as "too fast", "too dark", etc.) in the localization. In some implementations, the condition causing the inaccuracy in the localization is determined using a machine learning model. As described with respect to FIG. 5, a machine learning model may be trained using a classification error loss determined by comparing an estimated classification of the condition and ground truth classification of the condition causing the inaccuracy.

In some implementations at block 920, an accuracy of the localization is determined. In some implementations, the accuracy of the localization is also used in determining the condition causing inaccuracy in the localization. In some implementations, the accuracy of the localization is a measure of confidence or quality in the localization. In some implementations, determining an accuracy includes determining a level of accuracy from a plurality of levels of accuracy. For example, selecting a level of accuracy may be from a plurality of levels of accuracy corresponding to different distance thresholds. For example, levels of accuracy may include centimeter-level accuracy, room-level accuracy, building-level accuracy. In some implementations, accuracy may be assessed or determined using machine learning models. In some implementations, the machine learning model is trained using an error loss determined by comparing estimated poses of electronic devices and ground truth poses of electronic devices.

At block 930, the method 900 provides a view of an XR environment, where the inaccuracy in the localization affects the inclusion of virtual objects in the view of the XR environment. In some implementations, when the inaccuracy in the localization results in a low accuracy level of the localization, the virtual objects are not displayed or displayed using an adjusted display strategy. In some implementations, the view of the XR environment is provided in which virtual objects are positioned according to a display strategy (see block 840). For example, a world-locked display strategy may be used for a first accuracy level of the localization, a position-oriented display strategy is used for a second level of the localization, and a display-locked display strategy is used for a third accuracy level of the localization.

In some implementations at block 930, the view of the XR environment is provided where the virtual objects are displayed relative to the electronic device in the view of the XR environment. For example, the virtual objects are displayed world-locked at 6 DOF fixed positions relative to the electronic device in the view of the XR environment. In another example, the virtual objects are displayed position-oriented at a position two feet in front and 5 feet above the ground relative to the position of the electronic device (e.g., 3 DOF). In yet another example, the view of the XR environment is provided where the virtual objects are displayed display-locked at fixed positions on the display of the electronic device in the view of the XR environment. For example, the virtual objects are display-locked in the upper left corner of the display (e.g., 1 DOF).

At block 940, the method 900 provides a notification at the electronic device based on the condition causing inaccuracy in the localization. In some implementations, the notification based on the condition causing inaccuracy in the localization provided to the electronic device (e.g., "too fast-slow down", "too far-move closer", "too dark-turn on a light", etc.) enables a user of electronic device to improve the localization (see FIGS. 6-7). For example, resulting corrections at the electronic device based on the notification may improve the user experience by adjusting what virtual objects (e.g., one virtual object, local, regional, or all virtual objects) to display and/or how to display the virtual objects (e.g., display-locked, position-oriented, world-locked).

In some implementations, the method 900 corrects the condition causing the inaccuracy in the localization based on the notification. In some implementations, the condition causing the inaccuracy is corrected by a user of the electronic device modifying the physical environment and/or the sensor data used to perform the localization of the electronic device within the physical environment. For example, the user of the electronic device turns on a light or slows down to reduce motion of the electronic device based on the semantic condition "too dark", "too fast", respectively.

In some implementations, blocks 910-940 are performed by the same processor. In some implementations, the techniques disclosed herein may be implemented on a smart phone, tablet, or a wearable device, such as an HMD having an optical see-through or opaque display.

A physical environment refers to a physical world that people can interact with and/or sense without the aid of electronic systems. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the electronic device presenting the XR environment is a single device that may be hand-held (e.g., mobile phone, a tablet, a laptop, etc.) or worn (e.g., a watch, a head-mounted device (HMD), etc.). In some implementations, functions of the electronic device are accomplished via two or more communicating (e.g., wired or wireless) devices, for example additionally including an optional base station. Other examples include a laptop, desktop, server, or other such device that includes additional capabilities in terms of power, CPU capabilities, GPU capabilities, storage capabilities, memory capabilities, and the like.

Figure 10:
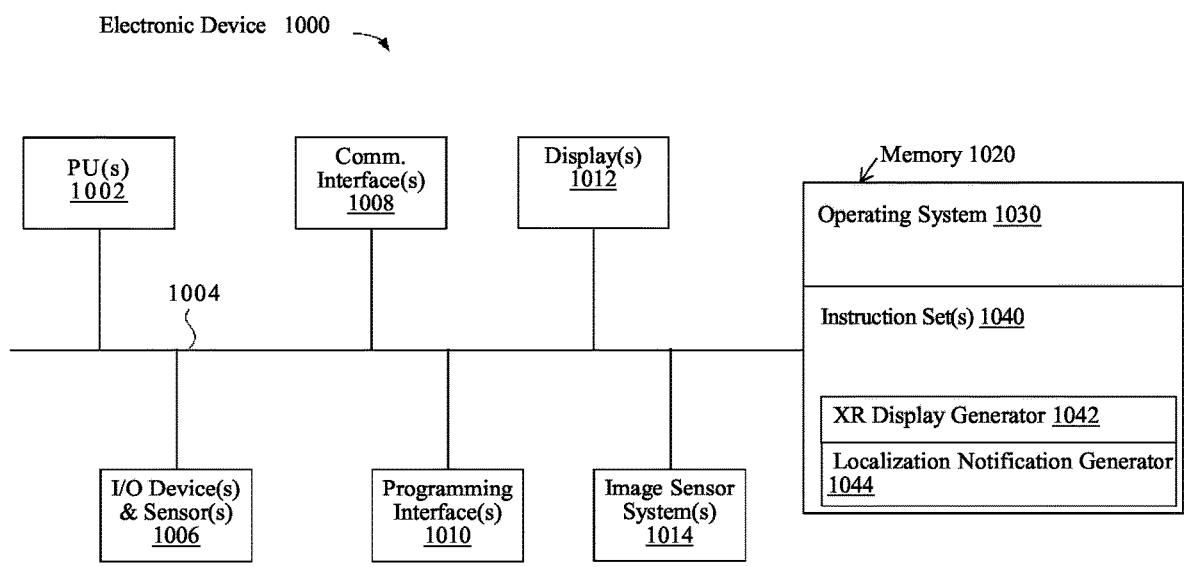
FIG. 10 illustrates an example electronic device in accordance with some implementations.

FIG. 10 is a block diagram of an example device 1000. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1000 includes one or more processing units 1002 (e.g., microprocessors, ASICs, FPGAs, GPUs, CPUs, processing cores, or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1010, one or more displays 1012, one or more interior or exterior facing sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 1012 are configured to present content to the user. In some implementations, the one or more displays 1012 correspond to holographic, digital light processing (DLP), liquid-crystal display (LCD), liquid-crystal on silicon object (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 1012 correspond to diffractive, reflective, polarized, holographic, etc. waveguide displays. For example, the electronic device 1000 may include a single display. In another example, the electronic device 1000 includes a display for each eye of the user.

In some implementations, the one or more interior or exterior facing sensor systems 1014 include an image capture device or array that captures image data or an audio capture device or array (e.g., microphone) that captures audio data. The one or more image sensor systems 1014 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 1014 further include an illumination source that emits light such as a flash. In some implementations, the one or more image sensor systems 1014 further include an on-camera image signal processor (ISP) configured to execute a plurality of processing operations on the image data.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium.

In some implementations, the memory 1020 or the non-transitory computer readable storage medium of the memory 1020 stores an optional operating system 1030 and one or more instruction set(s) 1040. The operating system 1030 includes procedures for handling various basic system services and for performing hardware dependent tasks. In some implementations, the instruction set(s) 1040 include executable software defined by binary information stored in the form of electrical charge. In some implementations, the instruction set(s) 1040 are software that is executable by the one or more processing units 1002 to carry out one or more of the techniques described herein.

In some implementations, the instruction set(s) 1040 include an XR display generator 1042 that is executable by the processing unit(s) 1002 to dynamically adjust among display strategies for virtual objects based on the accuracy of localizing an electronic device's position within a physical environment according to one or more of the techniques disclosed herein. In some implementations, the instruction set(s) 1040 include a localization notification generator 1044 that is executable by the processing unit(s) 1002 to provide notifications to an electronic device responsive to a condition causing inaccuracy in a localization of the electronic device's position within a physical environment according to one or more of the techniques disclosed herein.

Although the instruction set(s) 1040 are shown as residing on a single device, it should be understood that in other implementations, any combination of the elements may be located in separate computing devices. FIG. 10 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a processor:
performing a localization of an electronic device within a physical environment, the localization based on sensor data obtained by the electronic device;
determining an accuracy of the localization;
determining a display strategy based on the accuracy of the localization; and
providing a view of an extended reality (XR) environment in which virtual objects are positioned according to the display strategy.

2. The method of claim 1, wherein determining an accuracy comprises determining a level of accuracy from a plurality of levels of accuracy corresponding to different distance thresholds.

3. The method of claim 2, further comprising:
determining that the accuracy has changed to a second level of accuracy of the plurality of levels of accuracy; and
based on the accuracy having changed, updating the view of the XR environment to position the virtual objects according to a second display strategy different than the display strategy.

4. The method of claim 3, wherein the second display strategy is a display-locked display strategy according to which the virtual objects are positioned at fixed positions on a display of the electronic device or the second display strategy is a position-oriented display strategy according to which the virtual objects are positioned at fixed positions relative to the electronic device.

5. The method of claim 1, wherein the display strategy is a world-locked display strategy according to which the virtual objects are positioned at fixed 3D position and orientation relative to a 3D environment corresponding to the physical environment.

6. The method of claim 1, wherein the display strategy is a display-locked display strategy according to which the virtual objects are positioned at fixed positions on a display of the electronic device.

7. The method of claim 1, wherein the display strategy is a position-oriented display strategy according to which the virtual objects are positioned at fixed positions relative to the electronic device.

8. The method of claim 1, wherein the localization determines a pose of the electronic device within the physical environment.

9. The method of claim 1, wherein the accuracy is a measure of confidence in the localization.

10. The method of claim 1, wherein the accuracy is determined using a machine learning model.

11. The method of claim 10, wherein the machine learning model is trained using an error loss determined by comparing estimated poses of electronic devices and ground truth poses of electronic devices.

12. A system comprising:
memory; and
one or more processors at a device coupled to the memory, wherein the memory comprises program instructions that, when executed on the one or more processors, cause the system to perform operations comprising:
performing a localization of an electronic device within a physical environment, the localization based on sensor data obtained by the electronic device;
determining an accuracy of the localization;
determining a display strategy based on the accuracy of the localization; and
providing a view of an extended reality (XR) environment in which virtual objects are positioned according to the display strategy.

13. The system of claim 12, wherein determining an accuracy comprises determining a level of accuracy from a plurality of levels of accuracy corresponding to different distance thresholds.

14. The system of claim 13, wherein the operations further comprise:
determining that the accuracy has changed to a second level of accuracy of the plurality of levels of accuracy; and
based on the accuracy having changed, updating the view of the XR environment to position the virtual objects according to a second display strategy different than the display strategy.

15. The system of claim 14, wherein the second display strategy is a display-locked display strategy according to which the virtual objects are positioned at fixed positions on a display of the electronic device or the second display strategy is a position-oriented display strategy according to which the virtual objects are positioned at fixed positions relative to the electronic device.

16. The system of claim 12, wherein the display strategy is a world-locked display strategy according to which the virtual objects are positioned at fixed 3D position and orientation relative to a 3D environment corresponding to the physical environment.

17. The system of claim 12, wherein the display strategy is a display-locked display strategy according to which the virtual objects are positioned at fixed positions on a display of the electronic device.

18. The system of claim 12, wherein the display strategy is a position-oriented display strategy according to which the virtual objects are positioned at fixed positions relative to the electronic device.

19. The system of claim 12, wherein the localization determines a pose of the electronic device within the physical environment.

20. A non-transitory computer-readable storage medium, storing program instructions executable via one or more processors to perform operations comprising:
performing a localization of an electronic device within a physical environment, the localization based on sensor data obtained by the electronic device;
determining an accuracy of the localization;
determining a display strategy based on the accuracy of the localization; and
providing a view of an extended reality (XR) environment in which virtual objects are positioned according to the display strategy.

* * * * *